H. SHOEMAKER.
TRANSMITTING APPARATUS.
APPLICATION FILED AUG. 30, 1907.

921,293.

Patented May 11, 1909.

Witnesses
Daniel Webster, Jr.
Anna E. Steinbock

Inventor
Harry Shoemaker
By
Cornelius D. Ehret
Attorney

UNITED STATES PATENT OFFICE.

HARRY SHOEMAKER, OF JERSEY CITY, NEW JERSEY.

TRANSMITTING APPARATUS.

No. 921,293.   Specification of Letters Patent.   Patented May 11, 1909.

Application filed August 30, 1907. Serial No. 390,814.

*To all whom it may concern:*

Be it known that I, HARRY SHOEMAKER, a citizen of the United States, residing at Jersey City, county of Hudson, State of New Jersey, have invented certain new and useful Improvements in Transmitting Apparatus, of which the following is a specification.

My invention relates to transmitting apparatus, and particularly to transmitting apparatus for use in a signaling system wherein the energy is transmitted in electro-radiant form through the natural media.

It is the object of my invention to produce transmitting apparatus of the class described, in which a relatively great amount of electrical energy may be converted into high frequency energy, a storage device, such as a condenser, being employed to receive a charge from any suitable source and to be allowed to discharge in an oscillating circuit, having a natural high frequency, such circuit containing one or more condensers or storage devices other than that in communication with the charging source. By such an arrangement, a relatively large charge can be drawn from the charging source, and in the case of high power transmitters, the condensers are so disposed that, while a great amount of energy may be absorbed from the charging source, yet the natural period of the oscillation circuit may be suitably high.

My invention resides in the features hereinafter described and claimed.

Figure 1:
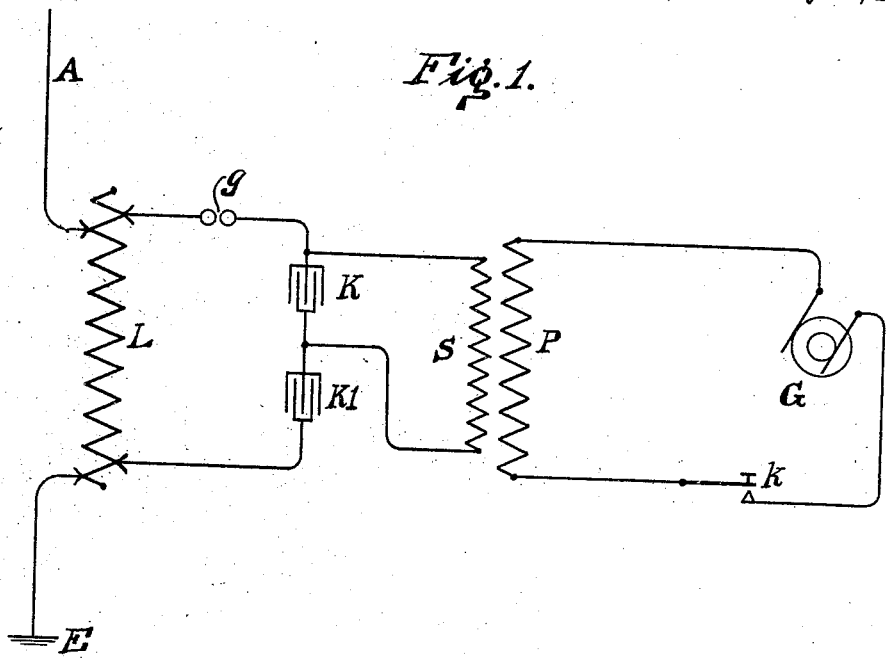
Figure 2:
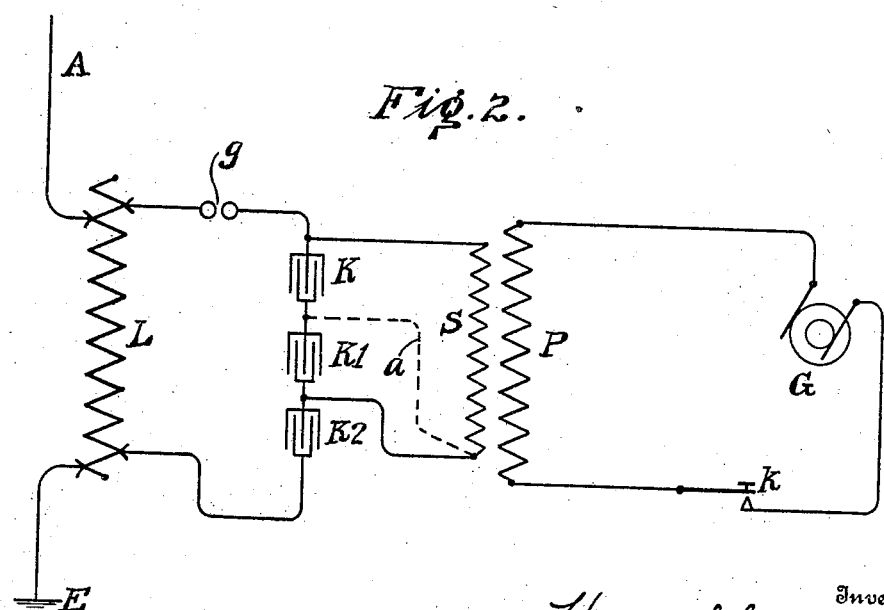

For an illustration of several of the forms my invention may take, particularly when employed in a telegraphic transmitter, reference is to be had to the accompanying drawing, in which:

Figure 1 is a diagrammatic view illustrating the circuits of the transmitting apparatus embodying my invention. Fig. 2 is a diagrammatic view of a modified form my invention may take.

Referring to Fig. 1, between the aerial conductor A and the earth or other suitable connection E is serially connected a variable portion of the inductance L, which may take the form of a helix, or other suitable form. Connected in shunt to a variable portion of the inductance L, is a circuit including the spark gap $g$ and the condensers K and K'. In shunt to one of the condensers, as for example, K, is connected the secondary S of a step-up transformer whose primary P is connected in circuit with a suitable source of fluctuating or alternating current, as G, and the operator's key $k$. The condensers K and $K^1$ are preferably, though not necessarily, of equal capacities. As to the oscillation circuit, L, $g$, K and $K^1$, the condensers K and $K^1$ are connected in series with each other and, therefore, the capacity of that oscillation circuit is, when the condensers are of equal capacities, one-half the capacity of either one. But inasmuch as only one of the condensers is connected to the secondary S of the charging transformer, the capacity as to the circuit including the secondary S is twice the capacity in the oscillation circuit. In consequence, the condenser K, at a given potential of the secondary S, will absorb twice as great a charge as in the case where all the condensers of the oscillation circuit are subjected to the secondary potential. This arrangement, therefore, affords means for absorbing a very great amount of energy from the charging source, while the natural frequency of the oscillation circuit is still maintained as high as necessary or desired. Thus, in high power transmitters it has been necessary to use very high charging potentials in order to store enough energy in the capacities or condensers, which capacities were necessarily small in order that the natural frequency of the oscillation circuit might be sufficiently high. It is preferred also that the condenser K be of such capacity that the circuit containing the condenser K and the secondary S of the transformer, should be resonant or approximately resonant for the frequency of the current passing through the primary P. In such case, the condenser K will absorb a very great or maximum charge even though the potential of the secondary S is not excessively high. By the arrangement shown, therefore, the natural frequency of the oscillation circuit is maintained high and as high as desired or necessary, while the amount of energy surging in it is greater than heretofore because of the greater charge which will be absorbed by the single condenser instead of the plurality of condensers in series across the secondary. It follows that while the frequency may be maintained as high as necessary or desired in the oscillation circuit, for high power transmitters the secondary need not supply as high a potential as heretofore practiced. Furthermore, the condenser $K^1$ operates as a restraining means and prevents any arc effect originating or existing in the gap $g$ from current derived from the secondary S, thus, making the spark at $g$ more abrupt and distinctly a spark as distinguished from an arc.

The operation is as follows: The operator manipulates the key $k$ in the well known manner to produce dots and dashes; when the key is closed the secondary S supplies a heavy charge to the condenser K and when it is charged a spark will leap at $g$ and the condenser K will then discharge its great charge through the oscillation circuit as previously traced, the natural frequency being, as well understood in the art, determined by the capacity and inductance of that circuit.

In Fig. 2, three condensers K, $K^1$ and $K^2$ are shown serially connected in the oscillation circuit, while two of them, K and $K^1$, are shown connected in series with each other across the terminals of the secondary S. The principle is the same as described in connection with Fig. 1; or, if desired, the secondary S may be bridged by the condenser K only in which case, the connection from the lower terminal of the secondary S would be made as shown by the dotted connection $a$. In such case, there would be two condensers in series besides the condenser K in the oscillation circuit. In other words, different numbers of condensers may be included in series in the oscillation circuit and different numbers may be bridged across the secondary S. In any case, however, the capacity subjected to the secondary S is always greater than the effective capacity as determining the natural frequency of the oscillation circuit.

Where I have shown single condensers K, $K^1$ and $K^2$, in both figures of the drawing, it is to be understood that such condensers may be a single condenser or may be a plurality of condensers in parallel. In practice, a convenient form of constructing such condensers is a plurality of Leyden jars or tubes connected in parallel with each other.

While I have here shown a telegraphic key for controlling the energy radiated, it is to be understood that any other signaling instrument may be employed, and that my invention is applicable as well to wireless telephony and other signaling systems.

What I claim is:

1. In combination, a closed oscillation circuit containing a plurality of condensers connected in series with each other and in series with inductance, a charging source, and a direct connection from said charging source to the terminals of less than the whole number of capacities in said oscillation circuit.

2. In transmitting apparatus, the combination with a radiating conductor, of an oscillation circuit associated therewith, a plurality of condensers serially connected in said oscillation circuit and coöperating to determine the period of said circuit, a source of energy, and a direct connection from said source of energy to the terminals of less than the whole number of condensers connected in said oscillation circuit, and a signaling instrument.

3. In transmitting apparatus, the combination with a radiating conductor, of a plurality of condensers serially connected and operating to determine the frequency of the radiated energy, a source of energy, a direct connection from said source of energy to the terminals of less than the whole number of said condensers, and a signaling instrument.

4. In transmitting apparatus, the combination with a radiating conductor, of a closed oscillation circuit including a spark gap, inductance, and a plurality of capacities, all said capacities coöperating to determine the period of said circuit, a source of energy, and a connection from said source of energy to the terminals of less than the whole number of capacities connected in said oscillation circuit.

5. In transmitting apparatus, the combination with a radiating conductor, of inductance included therein, a closed oscillation circuit including said inductance, a spark gap and a plurality of condensers, all said capacities coöperating to determine the period of said circuit, a source of energy, and a connection from said source of energy to the terminals of less than the whole number of condensers connected in said oscillation circuit.

6. In transmitting apparatus, the combination with a radiating conductor, of an oscillation circuit associated therewith and including a spark gap serially connected with a plurality of frequency determining condensers serially connected, a source of energy and a connection from said source of energy to the terminals of less than the whole number of condensers.

7. In transmitting apparatus, the combination with a radiating conductor, of an oscillator, said oscillator comprising a plurality of frequency determining condensers and a spark gap all serially connected, a source of energy, and a connection from said source of energy to the terminals of less than the whole number of condensers.

8. In transmitting apparatus, an oscillator comprising a plurality of frequency determining condensers and a spark gap all serially connected with each other, a source of energy, and a connection from said source to the terminals of less than the whole number of condensers.

In testimony whereof I have hereunto affixed my signature in the presence of the two subscribing witnesses.

HARRY SHOEMAKER.

Witnesses:
ANNA E. STEINBOCK,
JAMES M. SAWYER.